United States Patent [19]

Faulk, Jr.

[11] Patent Number: 5,321,695
[45] Date of Patent: Jun. 14, 1994

[54] PORT ARRIVAL IDENTIFICATION FOR COMPUTER NETWORK PACKETS

[75] Inventor: Robert L. Faulk, Jr., Roseville, Calif.

[73] Assignee: Hewlett-Packard Company, Palo Alto, Calif.

[21] Appl. No.: 693,845

[22] Filed: May 1, 1991

[51] Int. Cl.$^5$ ............... H04J 3/24; H04J 3/02; H04Q 11/04

[52] U.S. Cl. ................. 370/94.1; 370/85.13; 370/60; 370/94.3

[58] Field of Search ........ 370/94.1, 94.3, 60, 370/60.1, 85.13, 85.12, 110, 85.3, 85.14, 85.1, 85.2, 75

[56] References Cited

U.S. PATENT DOCUMENTS

| | | | |
|---|---|---|---|
| 4,597,078 | 6/1986 | Kempf | 370/94.1 |
| 4,627,052 | 12/1986 | Hoare et al. | 370/94.1 |
| 4,905,232 | 2/1990 | Newman | 370/94.1 |
| 4,930,123 | 5/1990 | Shimizu | 370/110.1 |
| 4,939,724 | 7/1990 | Ebersole | 370/85.15 |
| 4,996,524 | 2/1991 | Tojima | 370/94.1 |

*Primary Examiner*—Douglas W. Olms
*Assistant Examiner*—Chau T. Nguyen

[57] ABSTRACT

A multiple port network device, connected to a network, detects and records over which port of the multiple port network device other network devices communicate with the multiple port network device. A table is maintained in a memory. The table has entries which identify by which port of the multiple port network device other network devices communicate with the multiple port network device. The table is updated by monitoring packets received by the multiple port network device. When a packet is received by the multiple port network device, a port number over which port the multiple port network device received the packet is determined. Also, a source address of a network device from which the packet originated is determined. When the source address is not listed in the table, the table is updated with an entry for the source address which includes the port number.

4 Claims, 18 Drawing Sheets

IDLE MODE (NOT HAVING PACKETS)

RE-ENTER PROMISCUOUS MODE

PORT ARRIVAL MATRIX FOR 14-PORT HUB

| PORT # | DEVICE ADDRESS | PORT STATE |
|---|---|---|
| 1 | W | SINGLE |
| 2 | X | MULTIPLE |
| 3 | Y | SINGLE |
| 4 | Z | NONE |
| ⋮ | ⋮ | ⋮ |
| 14 | T | MULTIPLE |

*FIG 8*

PORT ARRIVAL MATRIX FOR 48-PORT HUB

| PORT # | DEVICE ADDRESS | PORT STATE |
|---|---|---|
| 1 | A | NONE |
| 2 | B | NONE |
| 3 | C | SINGLE |
| 4 | D | SINGLE |
| 5 | E | SINGLE |
| 6 | F | NONE |
| 7 | G | NONE |
| ⋮ | ⋮ | ⋮ |
| 47 | Q | MULTIPLE |
| 48 | . | . |

*FIG 9*

MAPPING ADDRESS SEARCH-
HUB IMPLEMENTATION

MAPPING ADDRESS SEARCH-BRIDGE IMPLEMENTATION

MAPPING ADDRESS OBJECTS
FIG 11A
| MAP ADDRESS | MAP STATE | MAP PORT | THIS DEVICE |
|---|---|---|---|
| S | PS-SINGLE | 2 | O |
FIG 11B
| MAP ADDRESS | MAP STATE | MAP PORT | THIS DEVICE |
|---|---|---|---|
| S | PS-NONE | NOT VALID | T |
FIG 11C
| MAP ADDRESS | MAP STATE | MAP PORT | THIS DEVICE |
|---|---|---|---|
| S | PS-SINGLE | 47 | X |
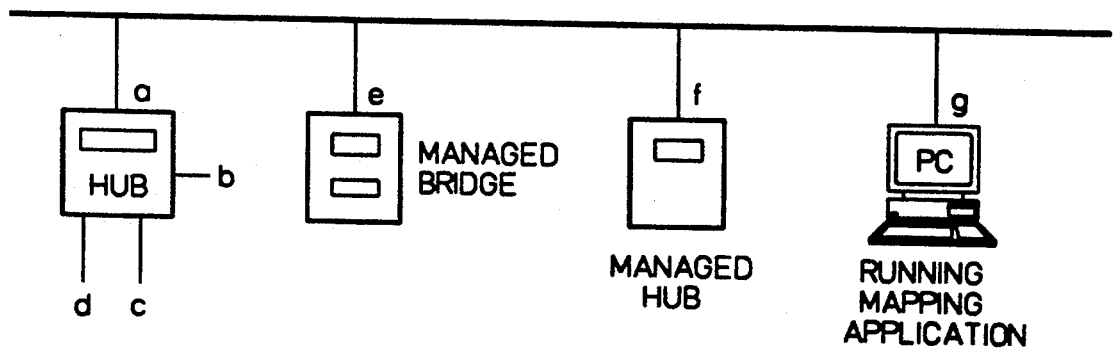
FIG 12A
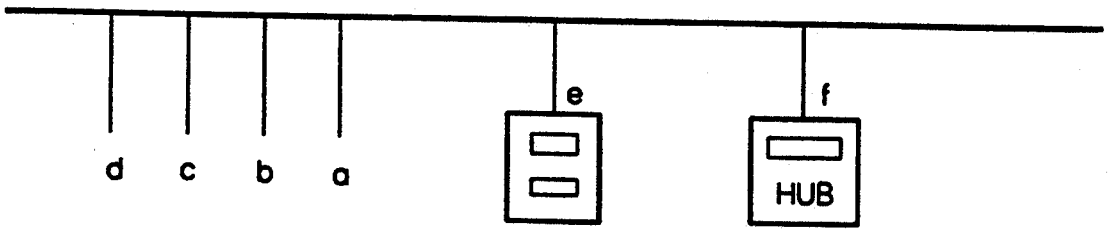
FIG 12B

PHYSICAL TOPOLOGY
FLOW CHART

NETWORK TOPOLOGY MAP DISPLAY

PORT ARRIVAL IDENTIFICATION FOR COMPUTER NETWORK PACKETS

BACKGROUND OF THE INVENTION

This invention relates generally to computer networks, and more particularly to different stations in a network interconnected through bridges and hubs.

For simple computer networks such as a LAN (local area network) located on a small office suite on a single floor of a building, it has been relatively simple to determine the actual network layout by inspection. However, networks now include many stations through the use of 12-port and 48-port repeaters called hubs, and different networks are often joined together by bridges so that data packets are sent across different networks to computer devices located in many different buildings and locations. It is not unusual to remove stations from a network and add other stations without telling the network administrator. Accordingly, a need has arisen for automatically collecting detailed accurate information about the layout and topology of computer networks.

BRIEF SUMMARY OF THE INVENTION

It is an object of the invention to provide a method for determining the arrival port of message packets received by an interconnect device such as a hub, obtaining from the message packet an identification of the sender, and then storing for easy accesibility a list of each port on the hub and its associated computer device. A related object is to obtain this arrival port information accurately, without acquiring false information based on spurious pulses and without interfering with any management functions which occur at the hub.

Another object of the invention is to provide a method for selectively listening at many different hubs for the arrival of message packets from a particular sender, and for periodically initiating a change to allow selective listening for the arrival of message packets from another particular sender.

Another object of the invention is to provide a method for instigating a particular station to send out an announcement packet to all multiple port repeaters such as hubs, and to bridges, with only minimal processing and distribution, and to enable individual hubs and/or bridges to identify which one of their ports is connected to that particular station.

Another object of the invention is to provide a method of processing the localized port arrival information for individual hubs and bridges in an extended network so as to determine and display the physical topology of the various network segments.

These and other objects will become apparent to those skilled in the art in view of the drawings and related written description of a presently preferred embodiment of the invention as set forth below.

BRIEF DESCRIPTION OF THE DRAWINGS

FIG. 8 is an exemplary port arrival matrix for a 12-port managed hub;

FIG. 9 is an exemplary port arrival matrix for a 48-port managed hub;

FIG. 11 shows the mapping address objects for the hubs of FIG. 3 which are programmed to listen for packets originating from a network device identified by its address X;

FIG. 12A shows a computer network layout having at least one differently designed hub, with a managed hub and a managed bridge both incorporating the present invention;

FIG. 12B shows how the network topology of FIG. 12A appears to the mapping application;

DETAILED DESCRIPTION OF PREFERRED EMBODIMENTS AND BEST MODE

Figure 1A:
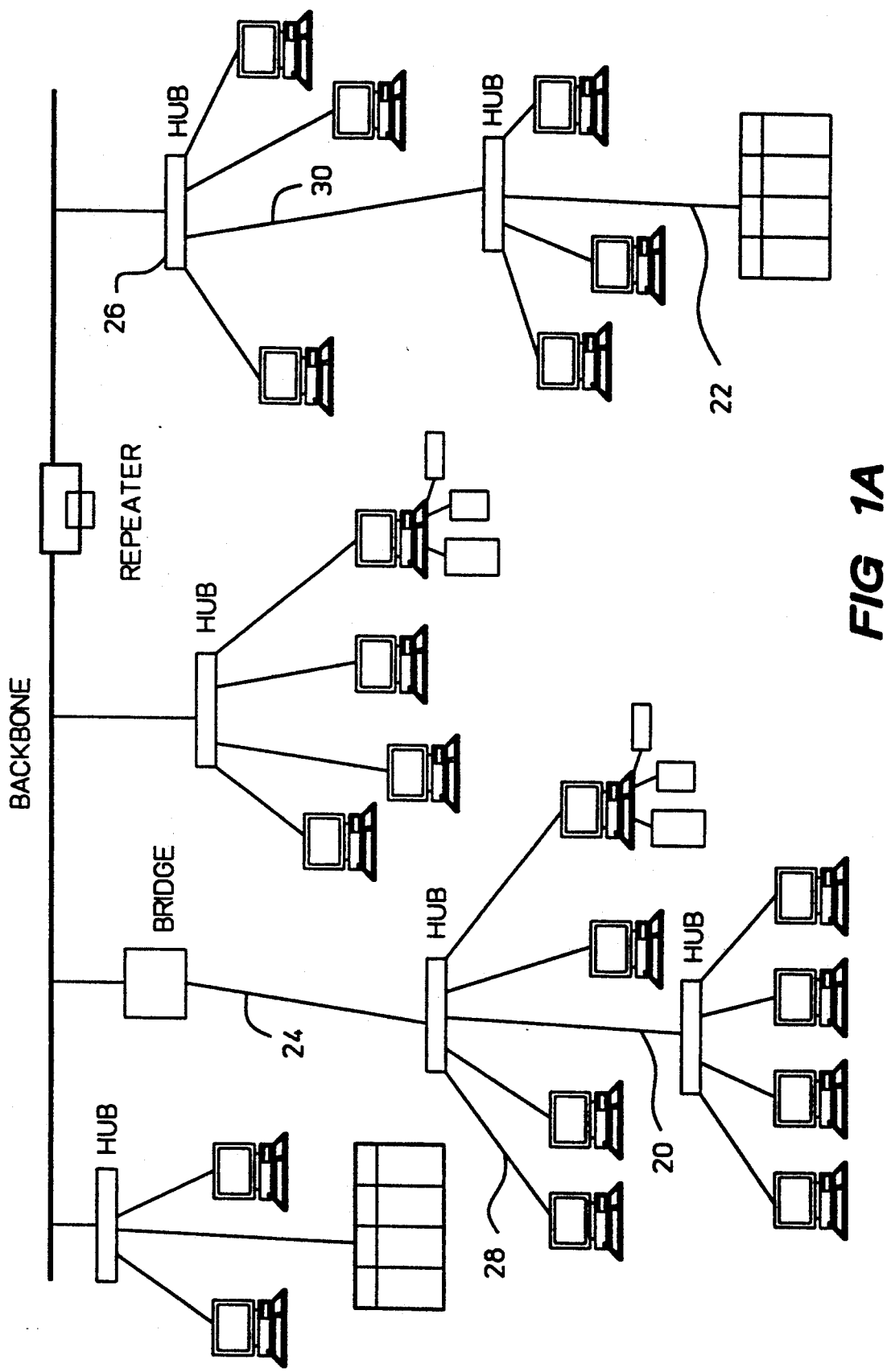
FIG. 1A shows a typical computer network layout having multiport repeaters (hubs) connected directly together as well as interconnected through a bridge.
Figure 1B:
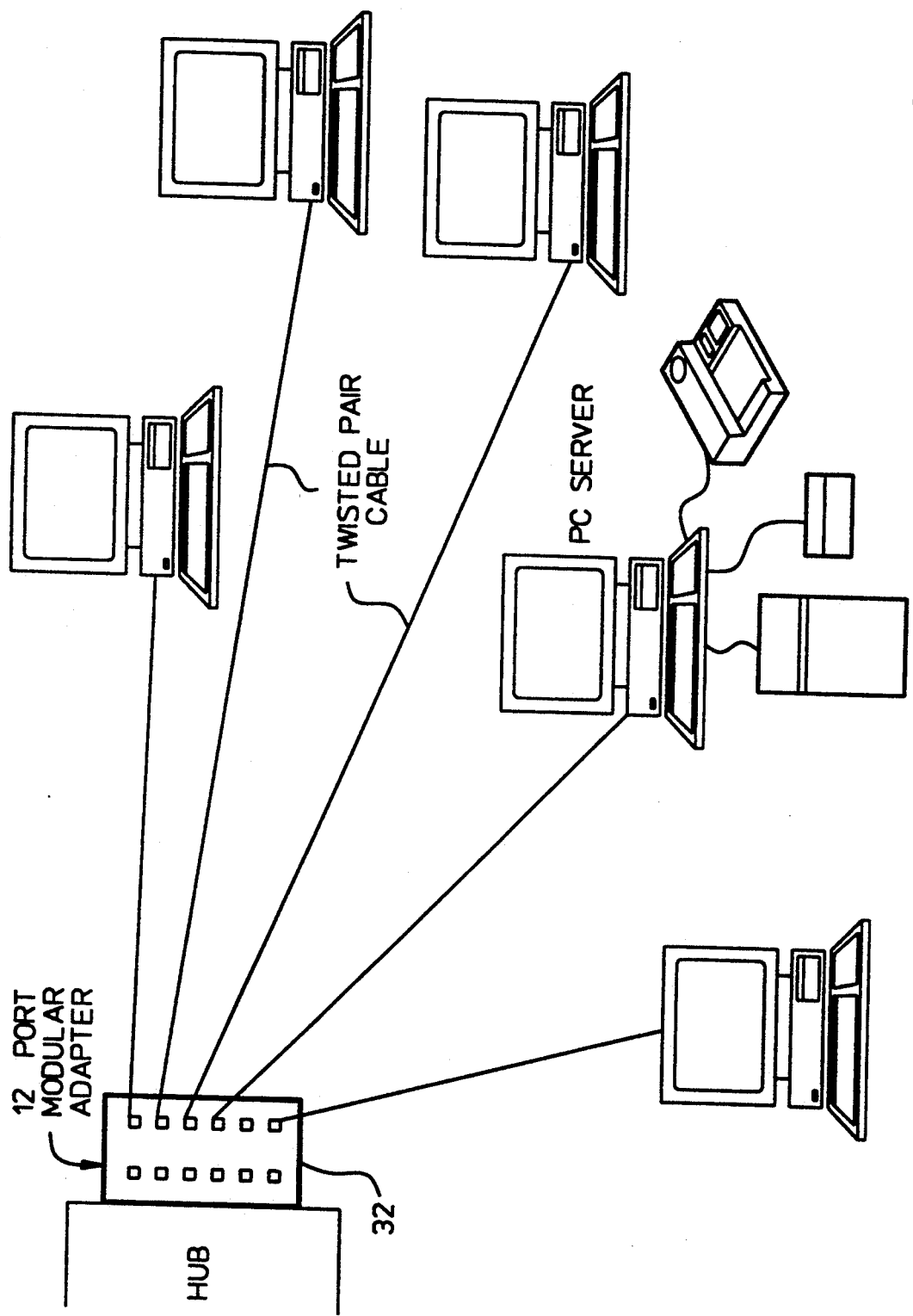
FIG. 1B shows a typical LAN hub of FIG. 1A having individual devices connected through twisted wire pairs to specific ports on the hub.

Generally speaking, the invention can be implemented in computer networks of various types and configurations, and the particular layouts shown are for purposes of illustration only. In that regard, the network layout of FIG. 1A shows how certain ports 20, 22 of their respective hubs 24, 26 receive packets from multiple senders. In contrast, other ports such as 28, 30 receive packets from one and only one sender (unless there is a configuration change made replacing one device with another or replacing one device with a multiport device such as a hub or bridge). FIG. 1B shows a hub with a 12-port modular adapter 32 for connecting individual ports to network devices through twisted-pair cable also known as the IEEE 802.3 10 BaseT standard.

Figure 2A:
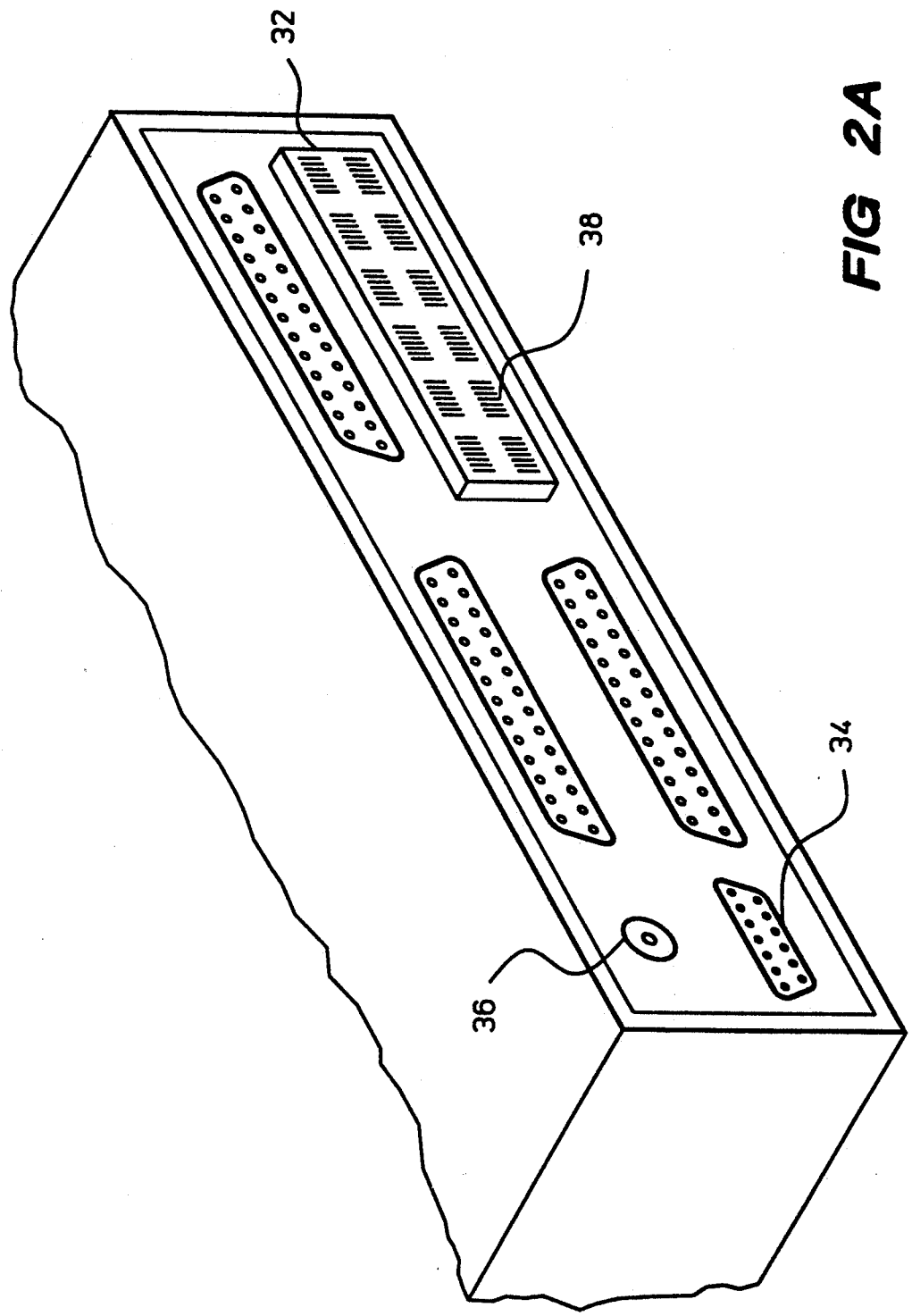
FIG. 2A is a schematic representation of the interconnect panel for a 48-port managed hub which incorporates the present invention.
Figure 2B:
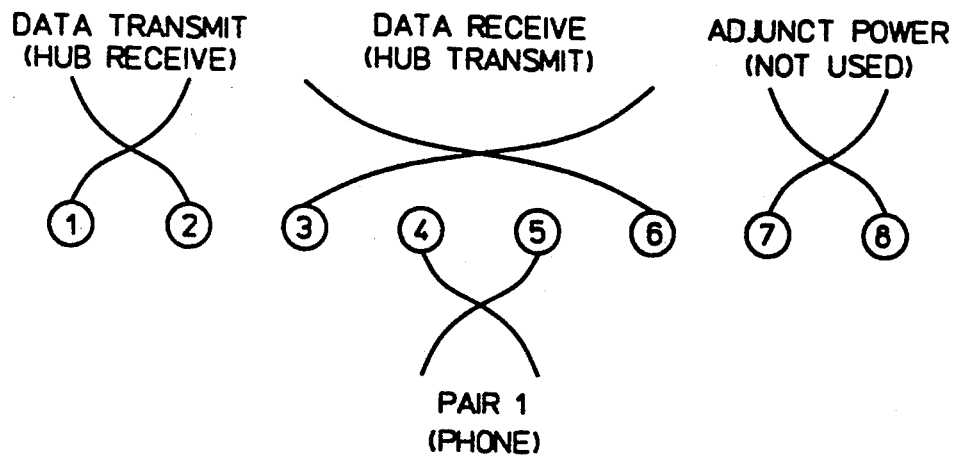
FIG. 2B shows a preferred wiring pattern for interconnecting 8-wire twisted pair cabling with the 48-port managed hub of FIG. 2A.

FIG. 2A shows the back interconnect panel for a 48-port hub having in addition an AUI port 34 and a BNC (coax) port 36. The manner of hooking up the four pair twisted wire cable to each port such as 38 is shown in FIG. 2B.

Figure 4:
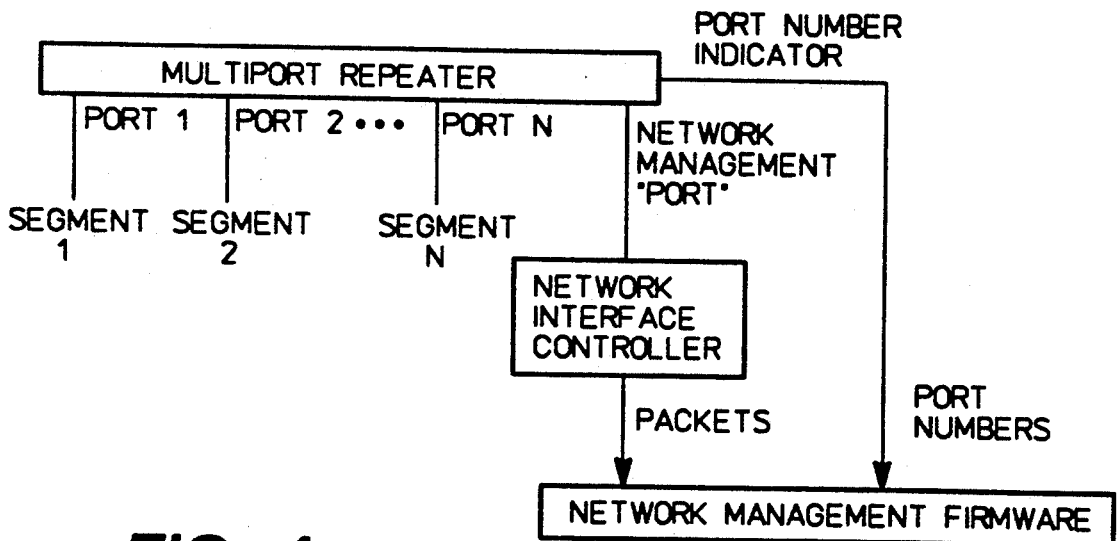
FIG. 4 shows a schematic diagram for the managed hubs of FIG. 3.

In a hub such as shown in FIG. 2A, it is useful to monitor the traffic on each port and keep track of the station address of the node connected to each port, as well as keep track of other detailed information about the traffic on that port. In some implementations of a hub, an off-the-shelf network interface controller (NIC) chip 40 is used for network management functionality and this controller chip is not integrated with the rest of the repeater hardware of the hub. The repeater 42 may tell the firmware 44 the port number of each packet repeated. Essentially such a hub may be structured as shown in the schematic diagram of FIG. 4.

If the NIC chip 40 is run in promiscuous mode (a mode in which it listens to all packets, instead of only those addressed to it), it is possible to correlate the packets received by the NIC with the port numbers for the repeater to obtain detailed per-port network statistics. This correlation can be accomplished by the routine set forth in the following table:

TABLE I

<NIC Interrupt Service Routine>
While the NIC has a new packet {
    Note the number of activity indications sent by the repeater
    Increment count of consecutive packets
    If there have been n consecutive packets without getting to
    the "idle" loop
        Exit promiscuous mode and only listen for network
        management packets
    If the NIC heard a packet, but the repeater did not, do not
    identify the port
    If the NIC heard a packet, but the repeater heard > 1
    packet, do not id port
    If the NIC heard a packet and the repeater heard exactly
    one packet then
        If the repeater heard exactly one packet for each of
        the previous packets serviced by this interrupt
            Identify the packet as coming from this port
        else
        (*)  Do not identify the port of this packet
}

If the network monitoring is overloading the hub and starts to degrade the response time to requests from a network management application, the hub will temporarily exit promiscuous mode and listen only to the network management packets addressed to it.

The method for correlating the port number with packets received by the NIC is complicated by several factors. For example, it is necessary for the firmware to respond to packet interrupts quickly—otherwise it will be overrun with packets and/or port numbers. Interrupts can be disabled at different times while the firmware is performing other network management related tasks. Further impairing interrupt response time is the relatively low-performance microcontroller which is used to reduce costs.

As an additional example, sometimes the repeater will hear small runt packets which are not heard by the NIC. In other words, there is not always a one-to-one correspondence between packets heard by the NIC and port numbers from the repeater.

Figure 5:
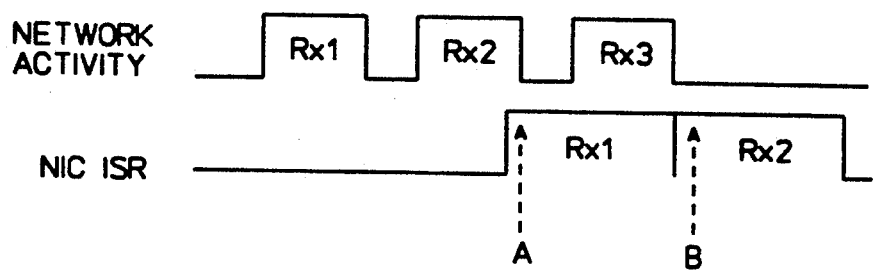
FIG. 5 is a timing diagram for a managed hub showing the difficulty of matching the correct port identification with its corresponding packet.
Figure 3:
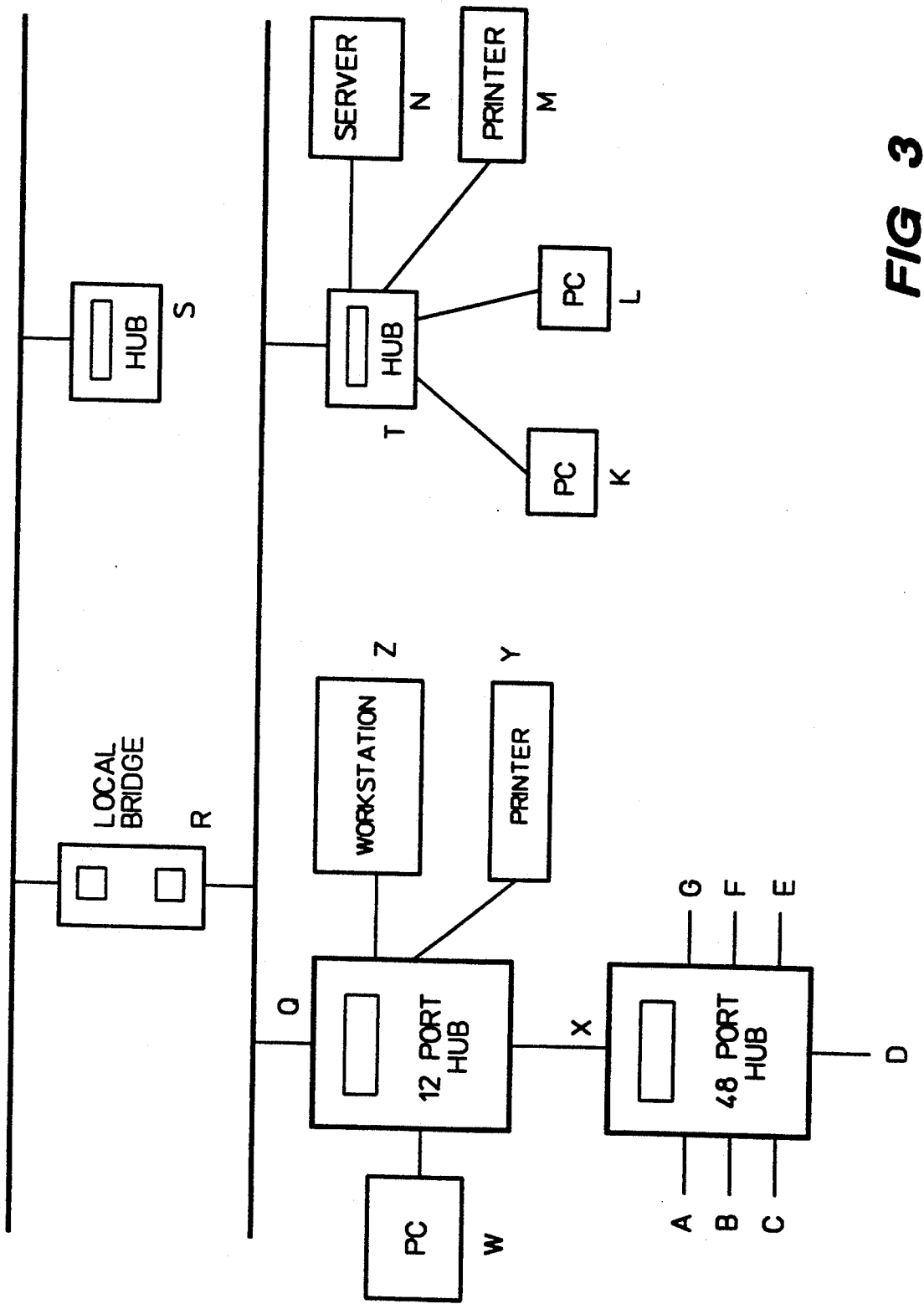
FIG. 3 shows a LAN layout having 12-port and 48-port managed hubs which incorporates the present invention.

Another situation arises with small back-to-back packets and is most common when these packet bursts arrive when interrupts happen to be temporarily disabled. The NIC interrupt occurs slightly after the port number is indicated by the repeater. In the diagram of FIG. 5, the network activity line is high when there is network activity. The NIC Interrupt Service Routine (ISR) line is high when executing the NIC Interrupt Service Routine. In the diagram of FIG. 5, the portion 44 indicates port activity for packet Rx1 and the corresponding portion 46 indicates the dma of the same packet RX1 by the NIC.

At point A in FIG. 5, the port for packet Rx1 is not known since the ISR observed two port numbers from the repeater (i.e., the ISR does not know if the extra port number is for a packet or if it is from a tiny runt port heard by the repeater but not by the NIC). At point B, the ISR sees exactly one port number and would normally mis-identify the port of packet Rx2 as the port of packet Rx3. The routine of Table I solves this problem.

Figure 6:
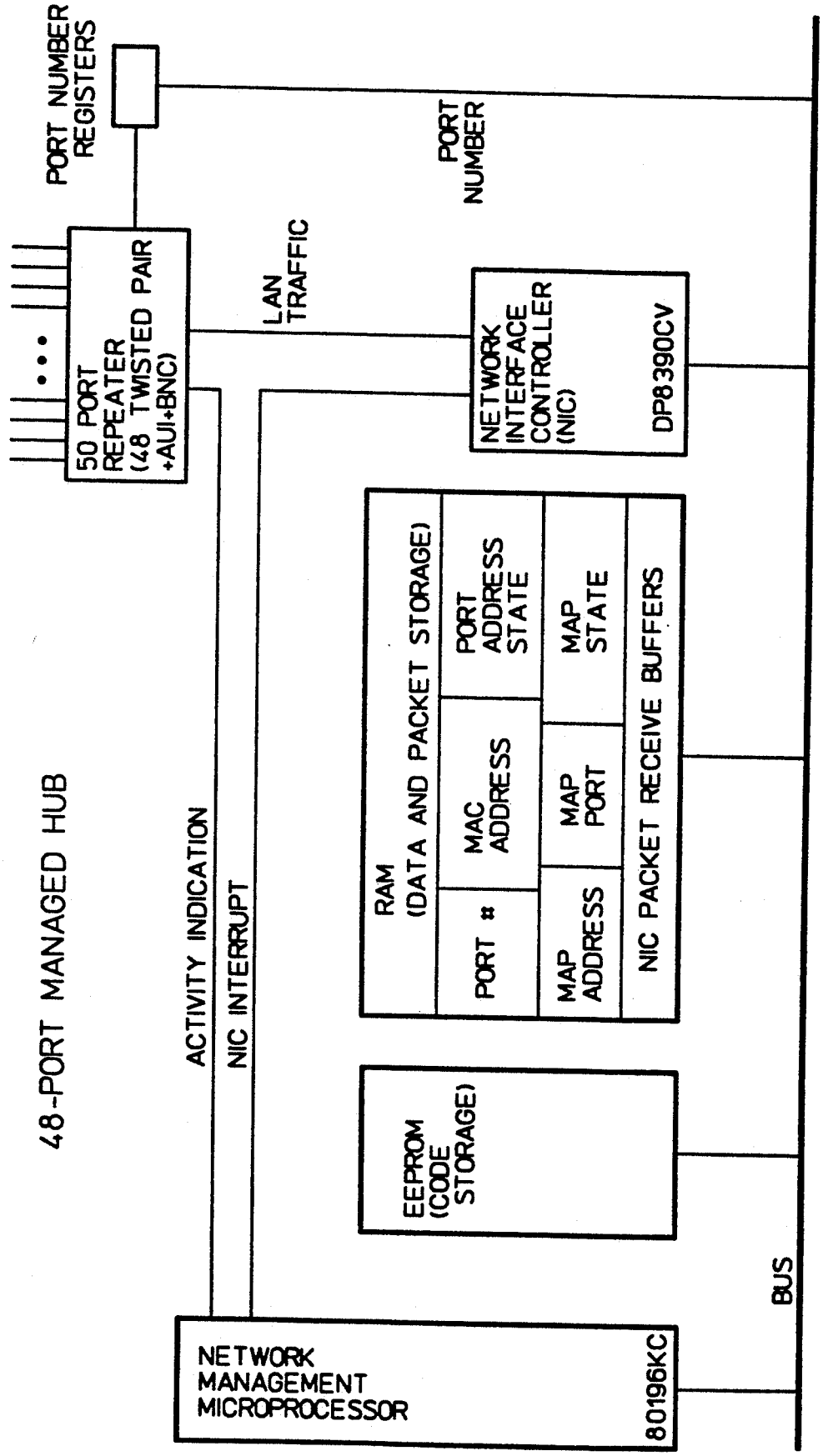
FIG. 6 is a block diagram for a 48-port managed hub featuring a preferred embodiment of the invention.

FIG. 6 shows a presently preferred embodiment for the invention in a managed hub implementation. A bus is used to interconnect the network management microprocessor, an EEPROM for code storage, a RAM, a network interface controller, and port number registers. The RAM includes space for normal data and packet storage, as well as space for implementing various features of the invention. The port arrival matrix of FIG. 9 is stored at one portion, the mapping address search objects of Table II are stored in another portion, and a third portion is used for the NIC packet receive buffers.

Figure 7A:
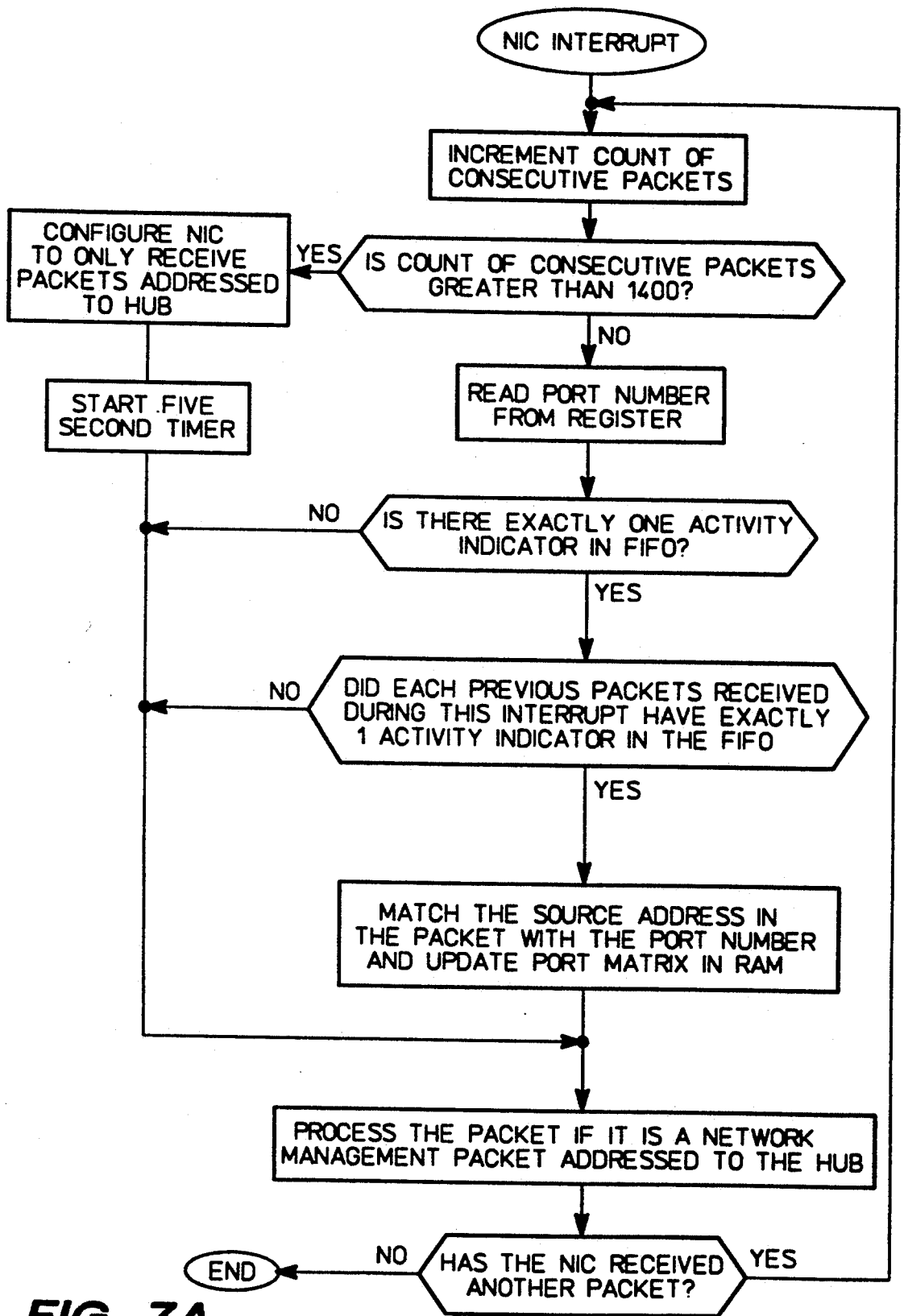
FIGS. 7A-7C are flow charts for the managed hub of FIG. 6 showing how port arrival identification is achieved for computer network packets received by the managed hub of FIG. 6.
Figure 7B:
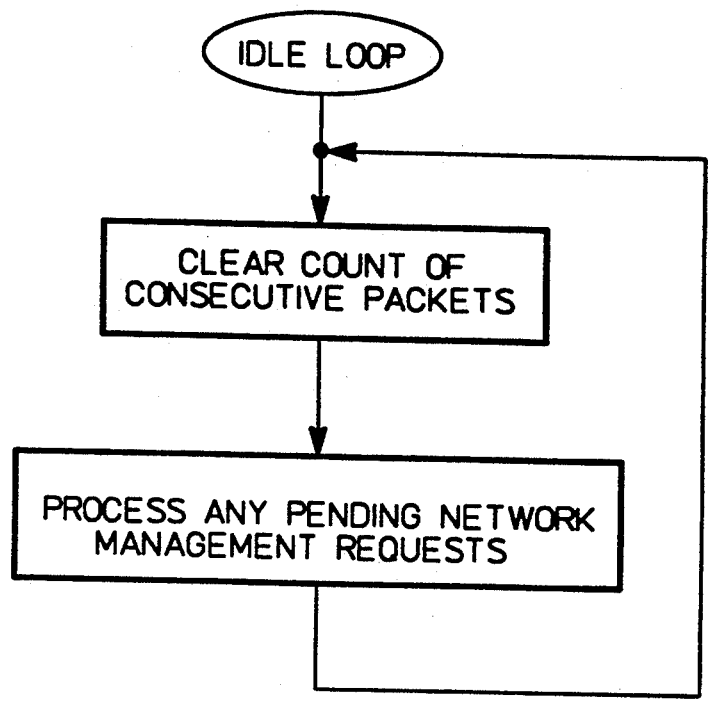
Figure 7C:
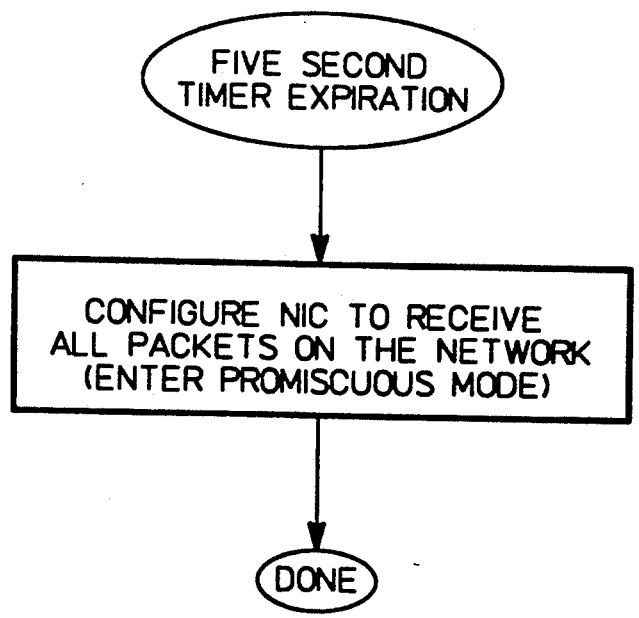
Figure 10A:
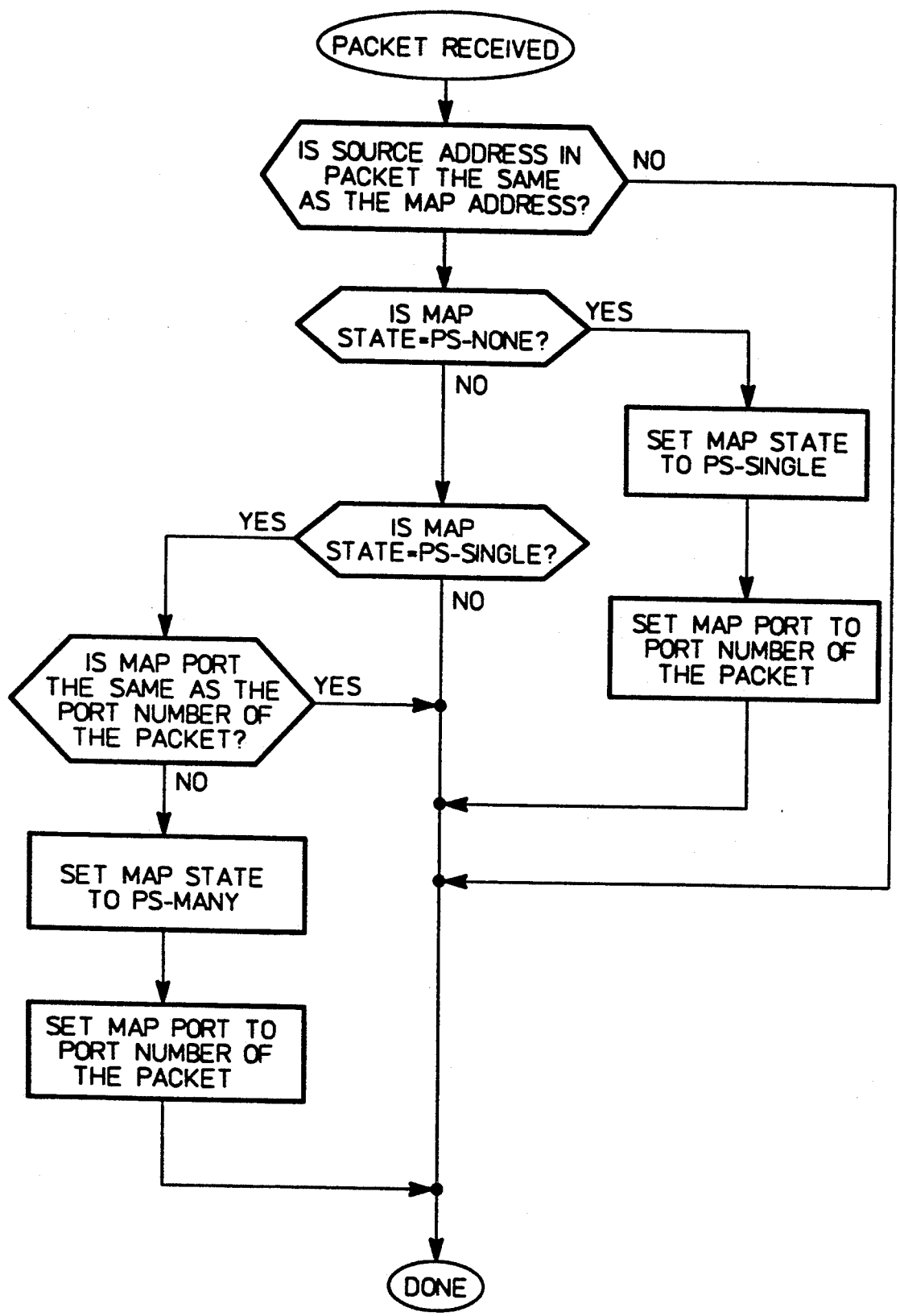
FIGS. 10A and 10B show two embodiments of a mapping address search flow chart for multiport repeaters such as the 12-port and 48-port hubs of FIG. 3.
Figure 10B:
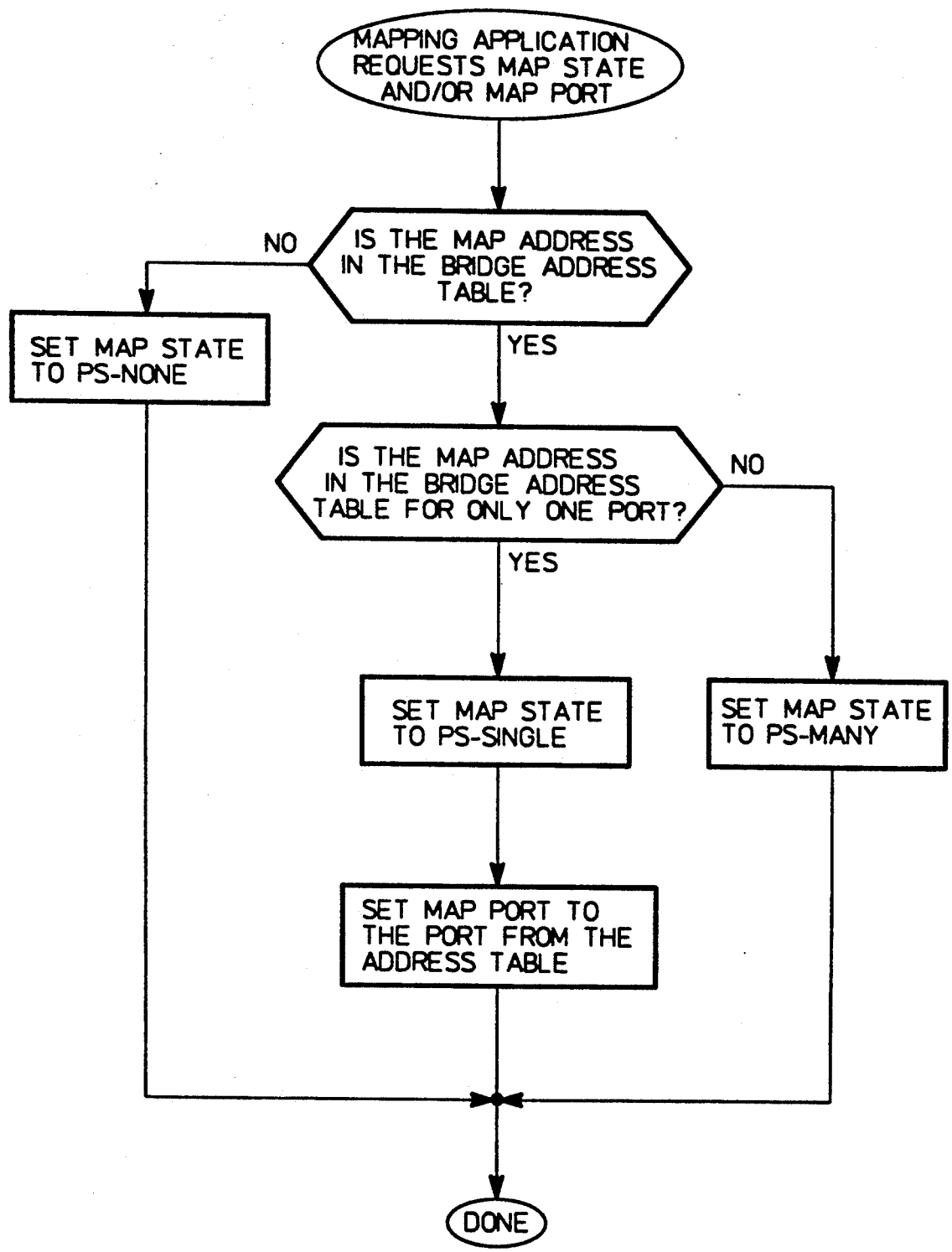

LAN traffic comes into a 50 port repeater causing an entry into a port number register having sufficient bits to identify all the input ports, and also causing an activity indication to the network management microprocessor. If in promiscuous mode (see the flow chart of FIGS. 7A, 7B and 7C), then the NIC receives and monitors all incoming packets. Otherwise, only the packets addressed to the hub are processed and the other packets are merely resent. The mapping address search objects are used in both hub and bridge implementations (see the flow charts of FIGS. 10A and 10B) which depict the map address procedure purely from the device's point of view. Note the differences between the hub (FIG. 10A) and the bridge (FIG. 10B) implementations. The Map Address Objects themselves are shown in the following table:

TABLE II

MAPPING ADDRESS SEARCH OBJECTS mapAddress OBJECT-TYPE
    SYNTAX OCTET STRING
    ACCESS read-write
    DESCRIPTION
        "When object is set a map address search begins. If the
        address is detected on only one port, then the mapPort
        object is set to the port number on which the address
        was detected. Bridge: the search complets immediatly.
        Hub: the search will continue until a new address is
        placed into mapAddress."
mapState OBJECT-TYPE
    SYNTAX INTEGER {
        PS_NONE(0),
        PS_SINGLE(1),
        PS_MANY(2)
    }
    ACCESS read-only
    DESCRIPTION
        "It will be set to PS_SINGLE if the map address is
        detected on one and only one port. If the map address is
        detected on more than one port, map state is set to
        PS_MANY."

TABLE II-continued
MAPPING ADDRESS SEARCH OBJECTS mapPort OBJECT-TYPE
    SYNTAX INTEGER (0 ... 65535)
    ACCESS read-only
    DESCRIPTION
       "The port number on which the map address was detected.
       If map state is PS_NONE or PS_MANY then this
       object is not valid."

The various mapping address objects are shown in FIG. 11 wherein each of the devices Q, T and X are programmed to listen for packets coming from the device having an S address.

To map a network of hubs, a mapping application needs to know which devices are connected to each of the hubs ports. The mapping application is able to poll the network and find out the addresses of each hub, but to make a complete map, it must know the ports on which each hub is connected. Some ports may be connected to hundreds of nodes and it is not feasible for each hub to keep a list of node addresses for each port.

To solve this problem, the Map Address object has been created. The mapping application simply sets the Map Address on a hub and the hub will listen for packets transmitted by the device specified by Map Address. When the Map Address is heard, the hub will record the port number on which the Map Address is heard and the mapping application will use this information to lay out the network map.

Figure 17:
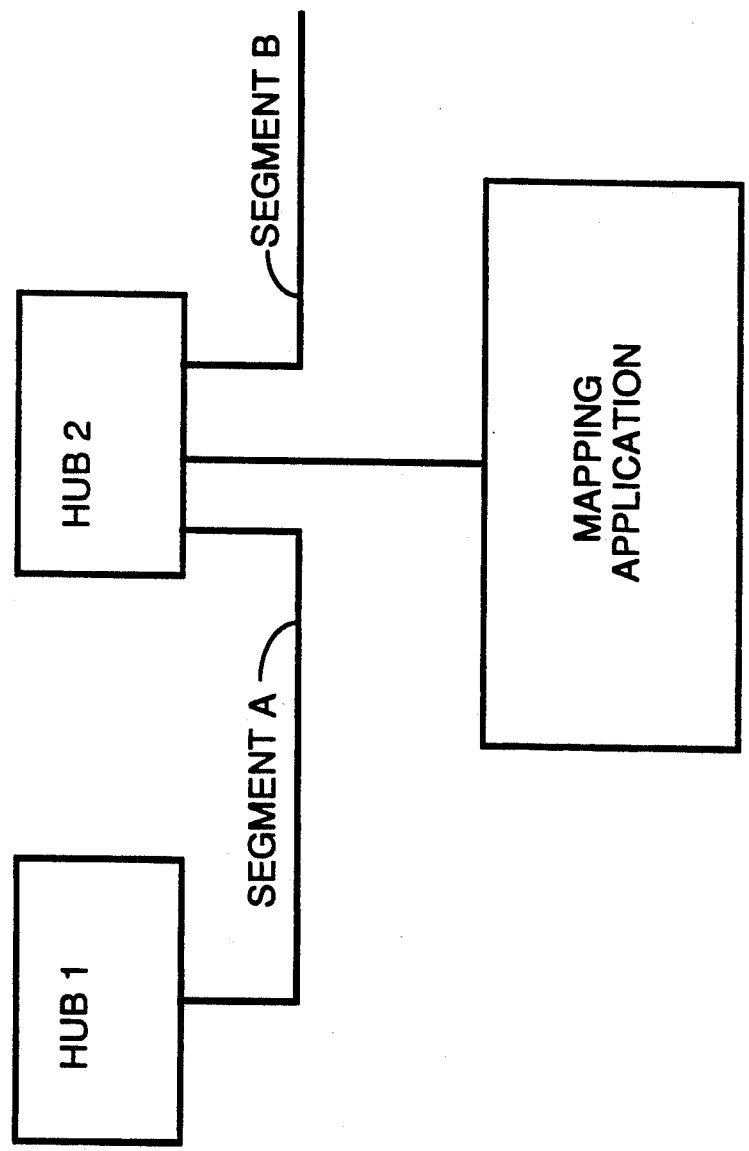
FIG. 17 shows a network topology used to illustrate the present invention.

In the network specified in FIG. 17, Hub 2 does not know which LAN segment Hub 1 is attached to, since many nodes are probably on each LAN segment. The mapping application can set the Map Address object on Hub 2 to the address of Hub 1. Later, when Hub 1 transmits a packet, Hub 2 will hear it and identify the port on which Hub 1 is connected.

TABLE III
MAPPING ANNOUNCEMENT announceAddress OBJECT-TYPE
    SYNTAX OCTET STRING
    ACCESS write-only
    DESCRIPTION
       "When set to any MAC multi-cast address, the device will
       transmit three identical packets, each with the MAC source
       set to the device's MAC address, the MAC destination to the
       multi-cast address, the DSAP is F8.
           These packets will traverse bridges, allowing them
       and devices connected to them to learn the port
       conectivity of the multi-casting device."

Figure 18:
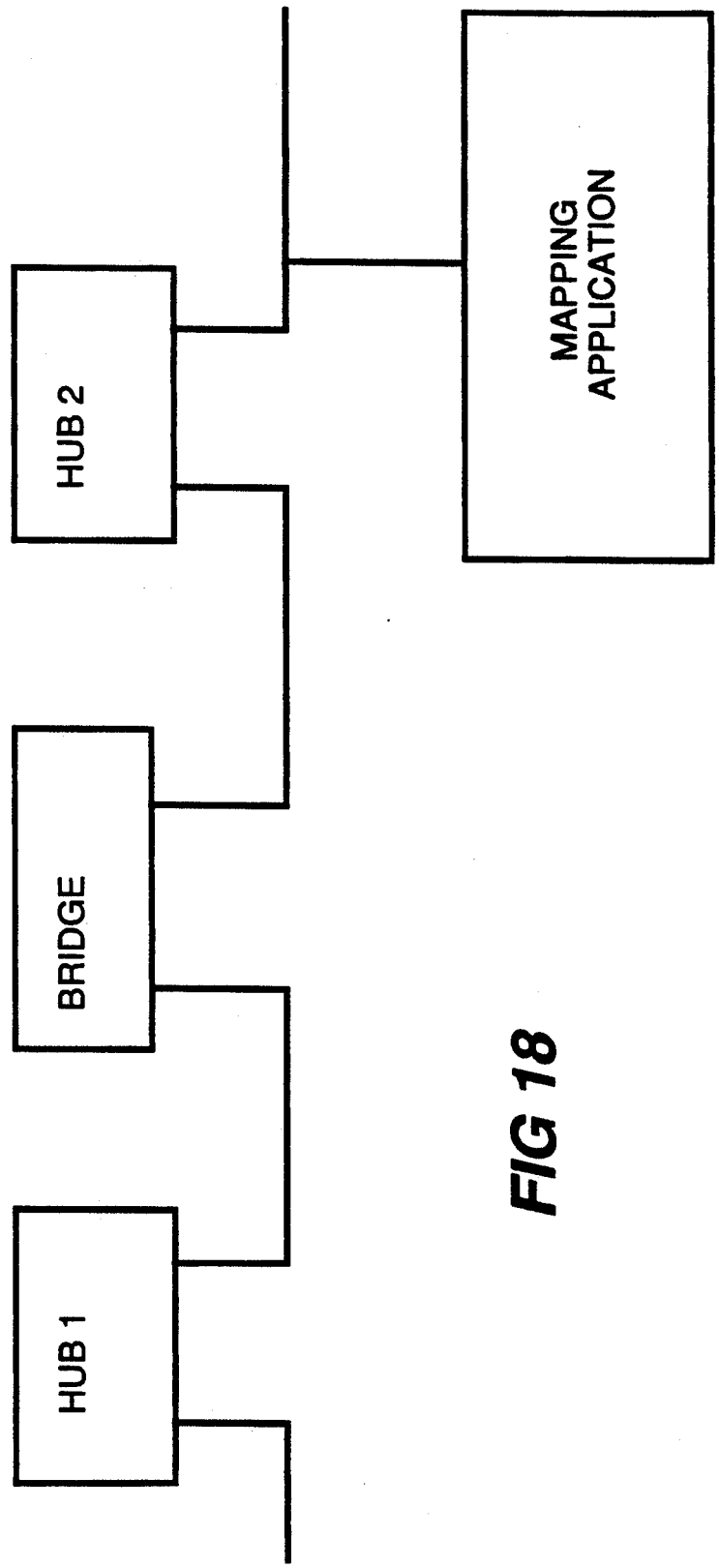
FIG. 18 shows a network topology used to illustrate the present invention.

To map a network of hubs, a mapping application needs to know which devices are connected to each of the hubs ports. The mapping application is able to poll the network and find out the addresses of each hub, but to make a complete map, it must know the ports on which each hub is connected. Some ports may be connected to hundreds of nodes and it is not feasible for each hub to keep a list of node addresses for each port. The Map Address object previously discussed solves much of this problem, but in FIG. 18 above, there is a problem with basic use of the Map Address object in that Hub 1 will never hear packets from Hub 2, since all communication between Hub 2 and the mapping application is filtered by the bridge.

The mapping application could look in the address table maintained by the bridge to find out how the hubs are connected, but this does not always work, since not all bridges have an address table which is readable by the mapping application. Also, using information gathered from the hubs is much simpler than incorporating the address table information gathered from bridges. To enable Hub 1 to hear packets from Hub 2 and identify the port on which it is connected the mapping application must make Hub 2 transmit some sort of announcement packet which can be heard by Hub 1. To do this, there are several alternatives:

A) Have Hub 2 broadcast a packet which goes across the entire network. This alternative will accomplish the mapping objective, but almost every single node on the entire network will need to process the packet and this will cause a significant amount of useless broadcast traffic which does not need to be heard by all nodes.

B) Have Hub 2 transmit a packet addressed directly to Hub 1. This alternative will also accomplish the mapping objective, but on a large network, the mapping application would need to tell the hub to transmit a packet to every other hub on the network, adding a significant amount of overhead to the mapping process.

C) Have Hub 2 transmit a multicast packet heard only by hubs. This is the ideal alternative, because the packet will go through the bridge and it will only heard by other hubs which listen for that multicast address. This is the method by which hub network mapping is done.

This invention solves the problem of determining the physical topology (that is, the interconnection of lan segments and interconnecting network devices) of a network. This is done automatically and produces a representation of the network which can be used for fault detection and diagnosis, performance characterization, and security.

Without the automatic determination of the physical topology of the network, the onus of mapping out the topology is on the human manager of the network, and is thus highly prone to error.

This invention uses mapping information available from repeaters and bridges to build a representation of the network. These repeaters and bridges are hereafter referred to as "networking devices". A networking devices connects two or more physical networking segments (coax, broadband, twisted-pair, fiber, etc) through its ports.

A networking device will have two or more ports. Through these ports, the device "hears" others devices and end stations (e.g. personal computers) which are part of the network. A networking device hears other devices and end stations out of one and only one port.

For the following description, assume the following network:

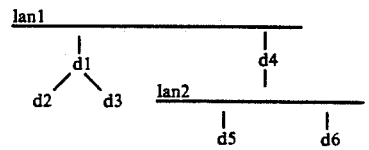

The algorithm first discovers the existence of bridges and repeaters in the network, resulting in a list of these networking devices:

→d1→d2→d3→d4→d5→d6→

The algorithm then selects a device arbitrarily from the list (although a simple heuristic could easily be applied to choose a device which would enhance the performance of the algorithm). From that device, the process of determining network topology begins. This is accomplished by determining where all of the other devices in the network are with respect to that device, by hearing out of which port that device is located.

For example, if device d2 is connected to a lan cable which is connected to d1's port 1, the d1 hears d2 on port 1.

The resulting network after this first step (from the point of view of arbitrarily chosen device d1) may look as follows.

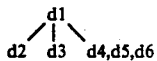

After this step is accomplished, it is possible to recursively visit each of the resulting "nodes" of this tree, and to eliminate those devices which are not actually directly connected to the calling device. In the above example, we would descend from d1 down to the node which contains d4, d5, d6. This goal here would be to eliminate those devices which are not directly connected to d1.

Looking at the original diagram, one can see that only d4 is directly connected to d1; d5 and d6 are connected to d1 through device d4. Algoritmically, the procedure for eliminating d5 and d6 is as follows;

First, select a device (for this example, we choose d4) and determine the port on which the calling device (d1) is heard. Then, try to eliminate the other nodes by showing that they are heard on a different port than the port on which the calling device is heard.

In the example, and choosing d4 as the "eliminator", if d4 hears d1 on port 1, and then hears d5 on port 2, then d5 is eliminated, because we have proven that d4 stands between d1 and d5 in the topology.

Applying this process recursively, the resulting hierarchy is a representation of the physical topology of the network. In the example, the resulting hierarchy would look as follows:

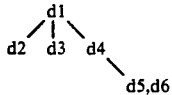

This representation of the network can then be used to draw a map of the network which looks like the original picture.

The value of automatically deriving the topology, versus manual attempts, can be easily seen.

Figure 13:
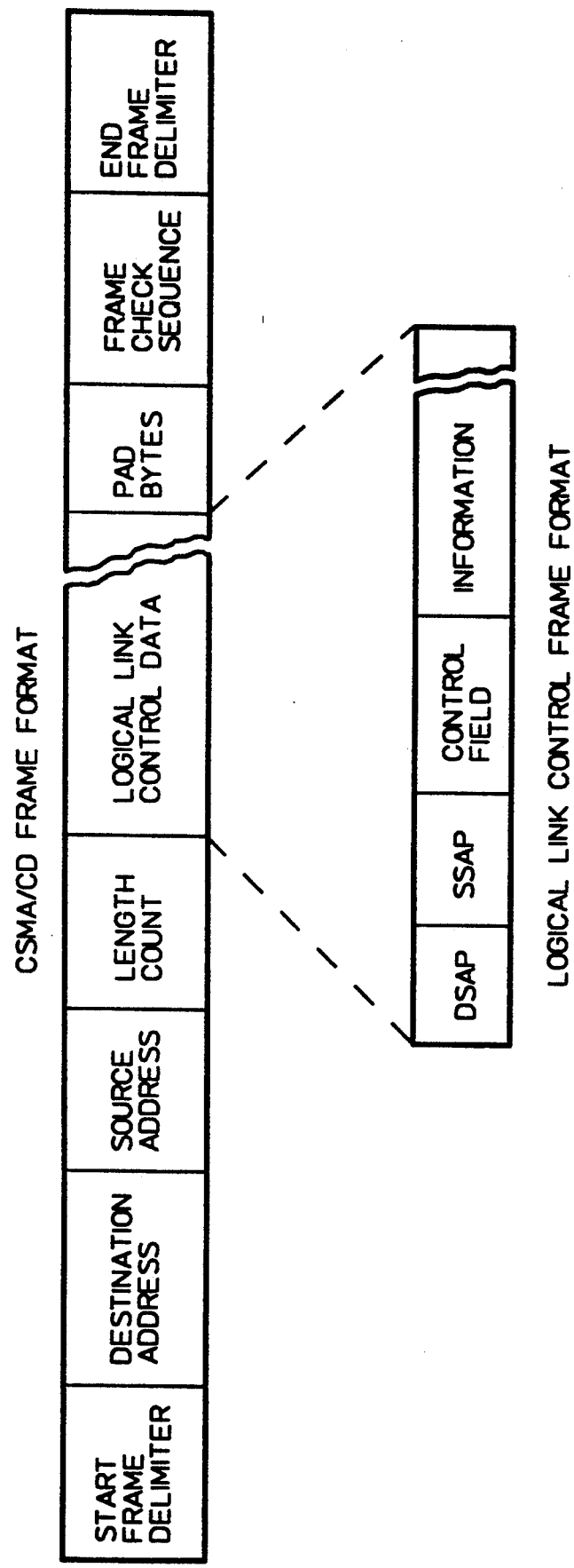
FIG. 13 shows a typical packet format for extended network mapping announcements sent to devices in an Ethernet-type of computer network.
Figure 14:
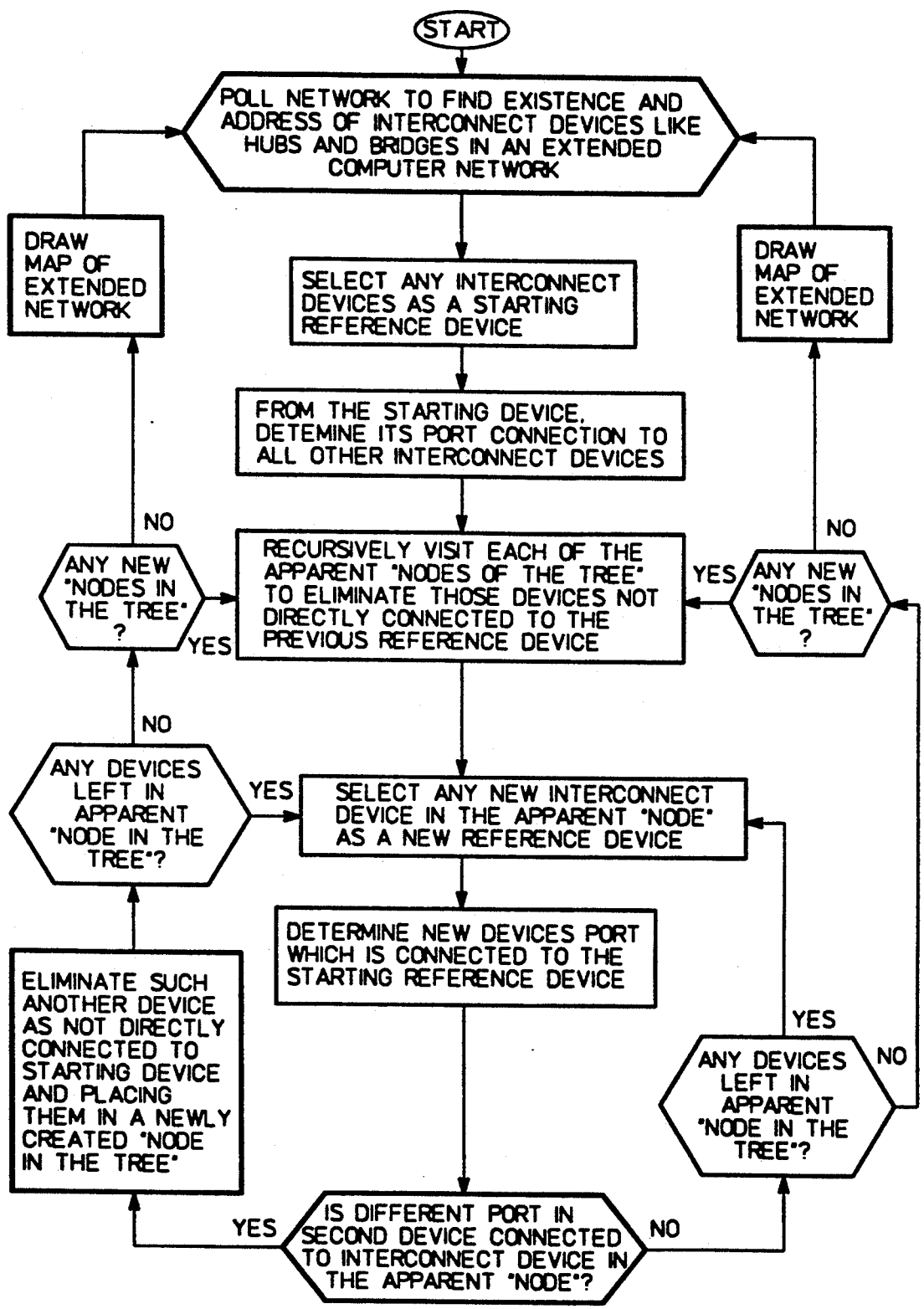
FIG. 14 is a flow chart for determining the physical topology across repeaters and bridges in an extended computer network.
Figure 15A:
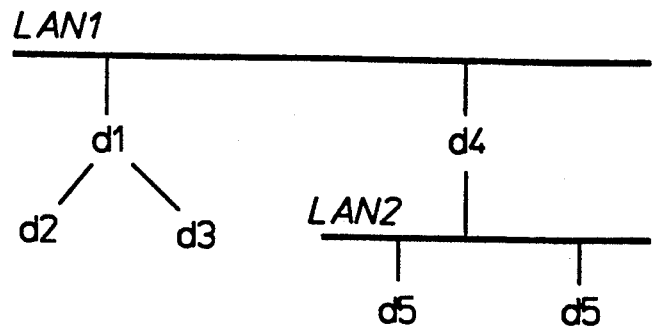
FIG. 15A is a schematic diagram of an extended network having two LANs.
Figure 15B:
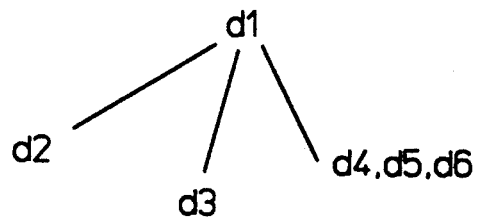
FIGS. 15B and 15C are exemplary tree diagrams used to implement the flow chart of FIG. 14 with respect to the extended network of FIG. 15A.
Figure 15C:
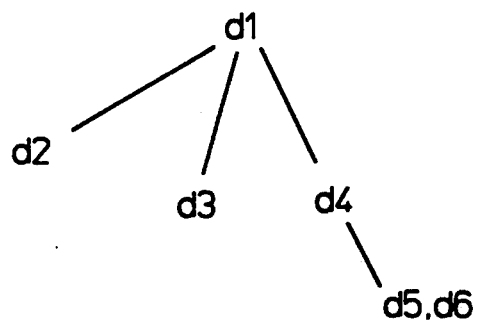

FIG. 13 shows a typical frame format which has the source address and destination address which are used in practicing this invention. Most packets are about 64 bytes long. FIG. 12 makes it clear that a non-managed hub or a managed hub that is of a different design will not be recognized as a true hub (see FIG. 12B).

Figure 16:
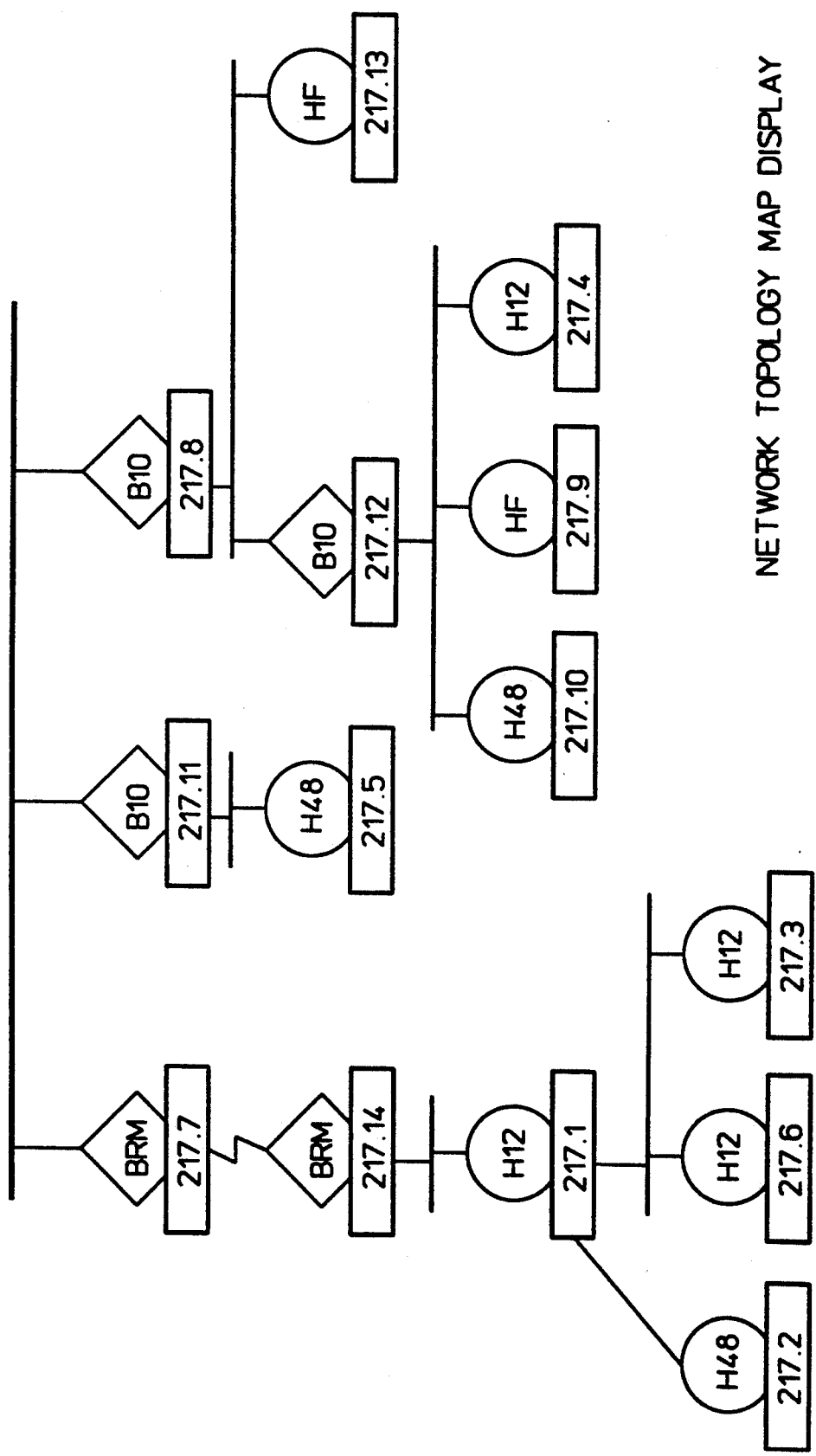
FIG. 16 is a network topology map display that is produced by the flow chart of FIG. 14.

FIG. 16 shows a network layout different from the other layouts in the drawings, and indicates the ability to draw a topology based on the information automatically acquired by practicing the unique procedures of the invention. The numbers indicate the Internet Protocol addresses, and H12 is a 12 port hub, H48 is a 48 port hub, HF is a fiber hub and BRM is a remote bridge which B10 is a local 10 MB bridge.

Of course, the invention is not limited to the examples shown, but can be modified and varied, all within the scope of the following claims.

I claim:

1. Within a multiple port network device connected to a network, an apparatus comprising:
   memory means for storing in a table entries which identify by which port of the multiple port network device other network devices communicate with the multiple port network device;
   monitoring means for determining port numbers which identify over which port the multiple port network device receives a packet;
   source identification means for identifying a source address of a network device from which the packet originated;
   table updating means, coupled to the memory means, monitoring means and source identification means, for, when the source address is not listed in the table, updating the table with an entry for the source address which includes the port number; and,
   disable means, coupled to the table updating means, for disabling the source identification means and the table updating means when the multiple port network device handles a predetermined number of packets without entering an idle state;
   wherein the multiple port network device includes a repeater and a network interface controller, and wherein the table updating means does not update the table with an entry when the network interface controller detects reception of a packet and the repeater does not.

2. Within a multiple port network device connected to a network, an apparatus comprising:
   memory means for storing in a table entries which identify by which port of the multiple port network device other network devices communicate with the multiple port network device;
   monitoring means for determining port numbers which identify over which port the multiple port network device receives a packet;
   source identification means for identifying a source address of a network device from which the packet originated;
   table updating means, coupled to the memory means, monitoring means and source identification means, for, when the source address is not listed in the table, updating the table with an entry for the source address which includes the port number; and,
   disable means, coupled to the table updating means, for disabling the source identification means and the table updating means when the multiple port network device handles a predetermined number of packets without entering an idle state;
   wherein the multiple port network device includes a repeater and a network interface controller, and wherein the table updating means does not update the table with an entry when the network interface controller detects reception of a packet and the repeater detects reception of more than one packet.

3. Within a multiple port network device connected to a network, a method for detecting and recording by which port of the multiple port network device other network devices communicate with the multiple port network device, the method comprising the steps of:
   (a) maintaining a table in a memory, the table in the memory having entries which identify by which port of the multiple port network device other network devices communicate with the multiple port network device;

(b) updating the table only when the multiple port network device does not handle a predetermined number of packets without entering an idle state, the table being updated by the following substeps;

(b 1) monitoring packets received by the multiple port network device;

(b.2) when a packet is received by the multiple port network device, performing the following substeps:

(b.2.1) determining a port number over which port the multiple port network device received the packet, (b.2.2) determining a source address of a network device from which the packet originated, and (b.2.3) when the source address is not listed in the table, updating the table with an entry for the source address which includes the port number, except however not updating the table with the entry when a network interface controller for the multiple port network device detects reception of a packet and a repeater for the multiple port network device does not; and, (c) when the multiple port network device handles a predetermined number of packets without entering an idle state, suspending updating of the table.

4. Within a multiple port network device connected to a network, a method for detecting and recording by which port of the multiple port network device other network devices communicate with the multiple port network device, the method comprising the steps of:

(a) maintaining a table in a memory, the table in the memory having entries which identify by which port of the multiple port network device other network devices communicate with the multiple port network device;

(b) updating the table only when the multiple port network device does not handle a predetermined number of packets without entering an idle state, the table being updates by the following substeps:

(b.1) monitoring packets received by the multiple port network device;

(b.2) when a packet is received by the multiple port network device, performing the following substeps:

(b.2.1) determining a port number over which port the multiple port network device received the packet, (b.2.2) determining a source address of a network device from which the packet originated, and (b.2.3) when the source address is not listed in the table, updating the table with an entry for the source address which includes the port number, except however not updating the table with the entry when a network interface controller for the multiple port network device detects reception of a packet and repeater for the multiple port network device detects reception of more than one packet; and, (c) when the multiple port network device handles a predetermined number of packets without entering an idle state, suspending updating of the table.

* * * * *